(12) United States Patent
Rylander

(10) Patent No.: US 8,032,384 B2
(45) Date of Patent: Oct. 4, 2011

(54) HAND HELD LANGUAGE TRANSLATION AND LEARNING DEVICE

(76) Inventor: Jay S Rylander, Key West, FL (US)

( * ) Notice: Subject to any disclaimer, the term of this patent is extended or adjusted under 35 U.S.C. 154(b) by 805 days.

(21) Appl. No.: 12/048,666

(22) Filed: Mar. 14, 2008

(65) Prior Publication Data

US 2009/0234636 A1    Sep. 17, 2009

(51) Int. Cl.
*G10L 21/00* (2006.01)

(52) U.S. Cl. ............... 704/277; 704/2; 704/3; 704/7

(58) Field of Classification Search ............ 704/277, 704/2, 3
See application file for complete search history.

(56) References Cited

U.S. PATENT DOCUMENTS

| | | | |
|---|---|---|---|
| 4,507,750 A | 3/1985 | Frantz et al. | |
| 4,984,177 A | 1/1991 | Rondel et al. | |
| 5,293,584 A | 3/1994 | Brown et al. | |
| D385,276 S | 10/1997 | Griggs | |
| 5,758,023 A | 5/1998 | Bordeaux | |
| 5,835,667 A * | 11/1998 | Wactlar et al. | 386/241 |
| 5,963,892 A | 10/1999 | Tanaka et al. | |
| 6,266,642 B1 * | 7/2001 | Franz et al. | 704/277 |
| 6,356,865 B1 | 3/2002 | Franz et al. | |
| 6,370,498 B1 * | 4/2002 | Flores et al. | 704/3 |
| 6,917,920 B1 | 7/2005 | Koizumi et al. | |
| 7,076,429 B2 * | 7/2006 | Basson et al. | 704/272 |
| 7,162,412 B2 | 1/2007 | Yamada et al. | |
| 2008/0312902 A1 * | 12/2008 | Dollinger | 704/4 |

OTHER PUBLICATIONS

Susan Kellerman "'I See What You Mean': The Role of Kinesic Behaviors in Listening and Implications for Foreign and Second Language Learning" Applied Linguistics (1992) 13 (3); pp. 239-258.*

Paul Brett "Multimedia for listening comprehension: The design of a multimedia-based resource for developing listening skills" System (1995), vol. 23, No. 1, pp. 77-58.*

* cited by examiner

*Primary Examiner* — Vincent P Harper

(57) ABSTRACT

The present invention features a hand-held language translation device comprising a microprocessor configured to receive (i) an audio input signal from a foreign speaker, and (ii) a simultaneous visual input signal generated by a camera which captures the facial expression and body language of the foreign language speaker while the foreign language speaker speaks, wherein upon receiving the audio input signal from the foreign speaker the microprocessor is capable of translating the spoken foreign language into a written form in the language of the user, whereby the written translation segment is stored in a searchable and retrievable manner.

1 Claim, 5 Drawing Sheets

This flow chart provides a general description of the chains of event that will happen during a typical translation session with the Hand-held Language Translation and Learning device based on a single microprocessor configuration.

HAND HELD LANGUAGE TRANSLATION AND LEARNING DEVICE

FIELD OF THE INVENTION

The present invention is related to language translation systems. More particularly, the present invention is related to a hand-held international language translation and learning system/device, including complimentary user-machine interfaces adapted to accommodate two users in an interactive translation session.

BACKGROUND

The following U.S. Patents are hereby incorporated by reference for their teaching of language translation systems and methods: U.S. Pat. No. 6,356,865, issued to Franz et al., entitled "Method and apparatus for performing spoken language translation"; U.S. Pat. No. 5,758,023, issued to Bordeaux, entitled "Multi-language speech recognition system"; U.S. Pat. No. 5,293,584, issued to Brown et al., entitled "Speech recognition system for natural language translation"; U.S. Pat. No. 5,963,892, issued to Tanaka et al., entitled "Translation apparatus and method for facilitating speech input operation and obtaining correct translation thereof"; U.S. Pat. No. 7,162,412, issued to Yamada et al., entitled "Multilingual conversation assist system"; U.S. Pat. No. 6,917,920, issued to Koizumi et al., entitled "Speech translation device and computer readable medium"; U.S. Pat. No. 4,984,177/issued to Rondel et al., entitled "Voice language translators; and U.S. Pat. No. 4,507,750, issued to Frantz et al., entitled "Electronic apparatus from a host language".

Although there have been many advances in system and software for providing language translation and learning assistance to users interested in communicating in a language other than their own, there has not been a system that can facilitate an interactive session of language translation and learning between two users. Accordingly, the present inventor has developed a system that can accommodate more than one user and facilitate an interactive language translation session. The present invention enables two users to interact and communicate using different languages, and can also facilitate learning of languages between two users. Such an advance can find use in international public settings where a language barrier exists between two users, and a translation system deemed necessary to facilitate communications between the users.

SUMMARY OF THE INVENTION

According to features of the present invention, an international language translation and learning system is provided that includes complimentary user modules adapted to accommodate two users in an interactive language translation session.

A hand-held international language translation and learning system can include a first user module that comprises of a user-machine interfacing device that includes several function keys and a keypad that allows numerical and alphabetical input, an electronic display, an audio input device to the machine that will also allow recording of such audio signal in digital or analog format upon activation by the user, an imaging and video input device to the machine that will also allow recording of such video signal or image content in digital or analog format upon activation by the user, and an internal or external portable storage device to store related data files. Such data files include the abovementioned audio and visual signal contents, as well as content of the language transcripts relating to the conversation. The system will include a second user module that comprises of a user-machine interfacing device that includes several function keys, an electronic display, an audio input device to the machine that will also allow recording of such audio signal in digital or analog format upon activation by the user, and an imaging and video input device to the machine that will also allow recoding of such video signal or image content in digital or analog format upon activation by the user, and an internal or external portable storage device to store related data files. (As used herein, a second user is the one speaking a "foreign" language in which the "first user" needs translation to her own first user language.) Such data files include the abovementioned audio and visual signal contents, as well as content of the language transcripts relating to the conversation. The system will include at least one microprocessor adapted to process synchronized translations between a first user using the first user module and a second user using the second user module and at least one language database for the microprocessor to access language files. In some embodiments, the spoken speech of the first user is transcribed in a first user's language on the first user's display, and is also (preferably simultaneously) transcribed in a second user's language on the second user's display. The Hand-held Language Translation and Learning Device, with the appropriate software and algorithm implementation, can also perform search on the international language database as well as on the recorded data files that include the audio and visual content by the date and time of the recording, by keywords chosen by the user, by the input of a particular segment of sound.

Accordingly, an international language translation and learning system can accommodate two users in a translation session by including two user-machine interfaces, two displays, two audio input devices such as microphones and headphones, two imaging and video input devices such as miniature digital cameras installed on the user modules, at least one microprocessor that supports access to searchable international language databases and the stored data files by the users. Each microprocessor can be represented by an independent computer system, however, dual- and quad-core processor are currently known in the art making it reasonable for a single computer system to handles complex processing required to support two independent language translation operations. These and other unique features of the present invention will be appreciated from a reading of the following detailed description and the appended claims.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DETAILED DESCRIPTION OF THE EMBODIMENT

Figure 1:
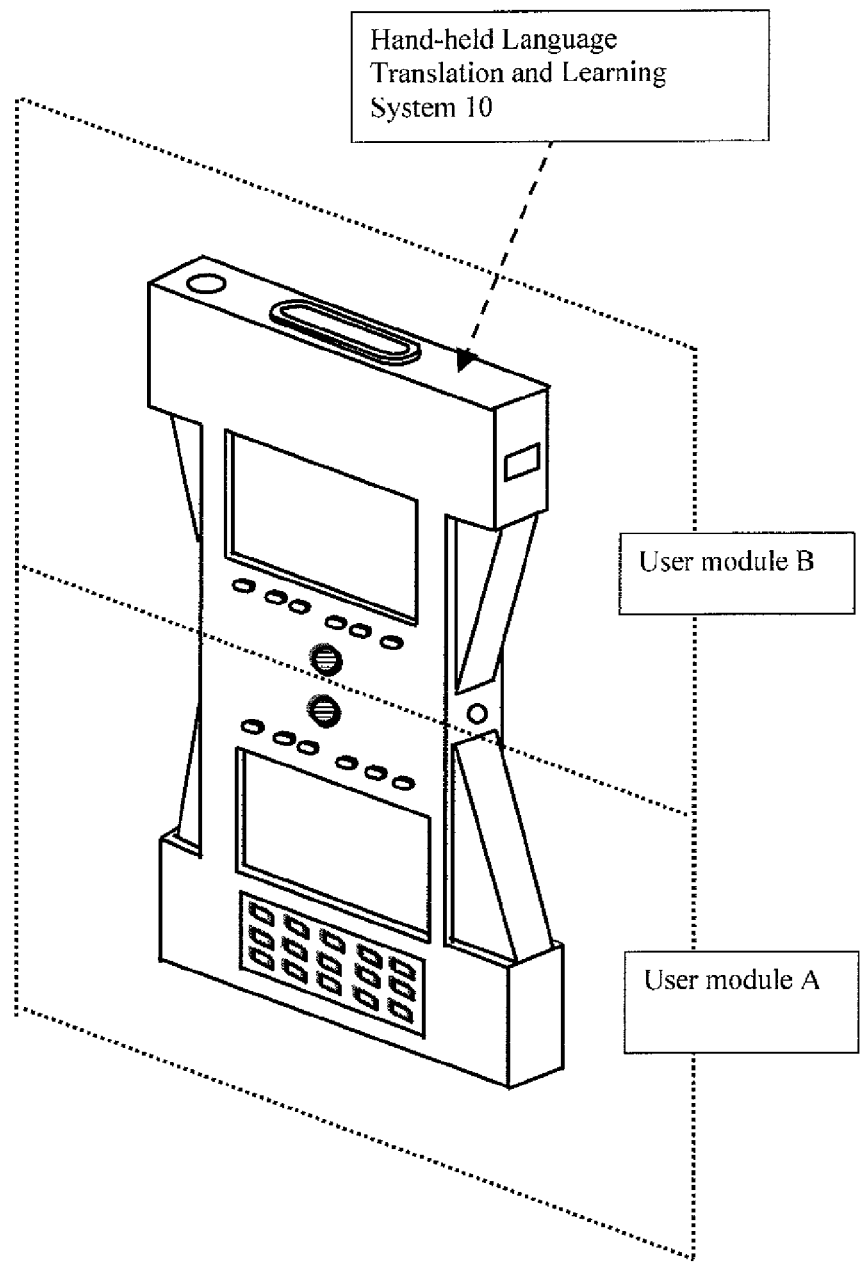
FIG. 1 is a front view of an international language translation and learning system showing the two user modules.
Figure 2:
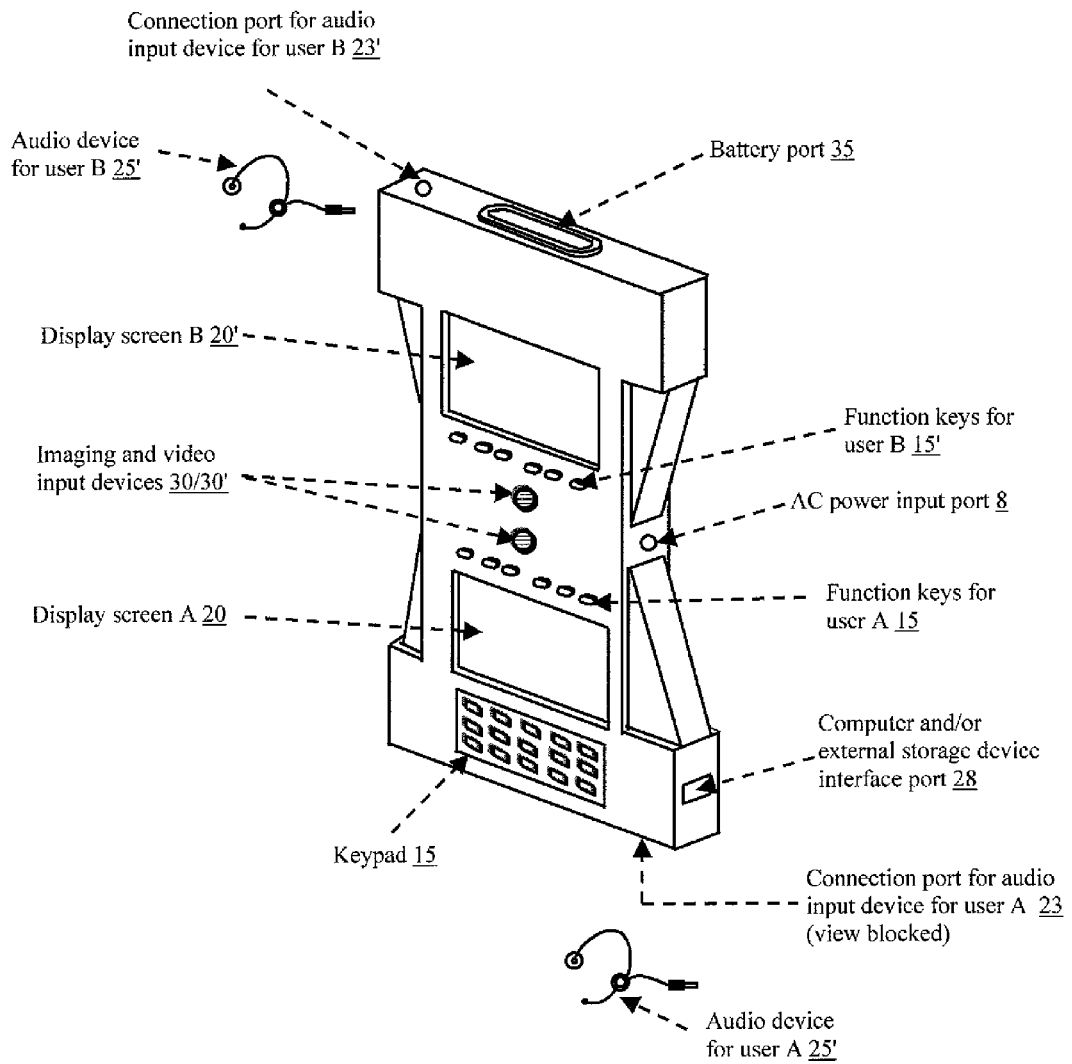
FIG. 2 is a detailed view of the international language translation and learning system of FIG. 1 in accordance with features of the present invention.

Referring to FIG. 1, the front view of an international language translation and learning system 10 is illustrated showing the two user modules. As shown in FIG. 1, there are two user modules of the international language translation and learning system 10. Module A, enclosed in the dashed square labeled as user module A, includes equipment associated with a first user (or User A). Referring to FIG. 2, a detailed view of the system 10 in accordance with unique features of the present invention is provided. At a minimum, module A includes a user-machine interface 15 that includes a keypad and a series of function keys, an electronic display 20, an audio input device 25, which can be provided in the form of combined headphone/microphone, and an imaging and video input device 30. The audio input device 25 can be plugged into an audio plug 23. Module A can also include a port 28 that will provide connection between a laptop computer (not shown) and the hand-held language translation and learning device so that files and resources sharing is possible. However, such connection can also be achieved by a wireless port that allows connection between the computer and the Device.

Port 28 will also provide connection between an external storage device and the Hand-held Translation and Learning Device. The external storage device can be any type of popular recordable media storage devices, including flash memory such as SD memory sticks and recordable CD/DVD. Flash memory currently is a preferred medium for portable recordings because it is non-volatile computer memory that can be electrically erased and rewritten. It is a technology that is primarily used in memory cards, USB flash drives (thumb drives, handy drive, memory stick, flash stick, jump drive), which are used for general storage and transfer of data between computers and other electronic devices. Using the record button included in the function keys 15, the user can record the language exchange sessions between the two speakers on the said external storage device or the internal storage unit provided by the language translation and learning system 10. Such records can be played back at a later time, either using an international language translation and learning system 10, or at home or the office using a personal computer (not shown). Recording the conversation session that includes audio and visual contents and the transcripts of the conversation onto a recordable memory would allow a user to learn the language at his or her own pace. Also shown is a playback button 18, which can be used on an international language translation and learning system 10 to playback translation session recorded on recordable memory.

As shown in the area labeled as user module B, module B of the international language translation and learning system 10 at a minimum includes hardware that is complimentary to the minimum equipment required at module A to support a second user (e.g., User B) except a keypad input. At a minimum, module B includes a user interface 15', a display 20', an audio input device 25', which can be provided in the form of combined headphone/microphone, and an imaging and video input device 30'. The audio input device 25' can be plugged into an audio plug 23' supporting module B. Record button 17' and playback button 18' can also be provided to provide session recording and playback as described above.

As can be appreciated by the representation of two distinct modules, module A and module B, of the international language translation and learning system 10, two users speaking two different language can interact with each other given the hardware provided by thereon. Displays 20/20' can be used to view and select system features, or to view text-to-text and speech-to-text translations. The user interfaces 15, 15' can include function keys and keypad for the user to operate the international language translation and learning system 10. For example, the function keys will include an on/off switch to power on/off the system 10, language selection switch(es) to step through multiple languages that can be selected for translation through the system 10, volume switch(es) to increase/decrease audio volume at the audio input devices 25/25' and a lock button to hold settings selected by a user during a translation or learning session. Power can be provided to the international language translation and learning system 10 through an AC power input 8. The power input can enable direct electrical connection to power services provided by surrounding infrastructure (e.g., inside an international airport) Battery port 35 can provide a means to rechargeable batteries (not shown) that may be included in the system for field operation when power outlets are not available.

Figure 3:
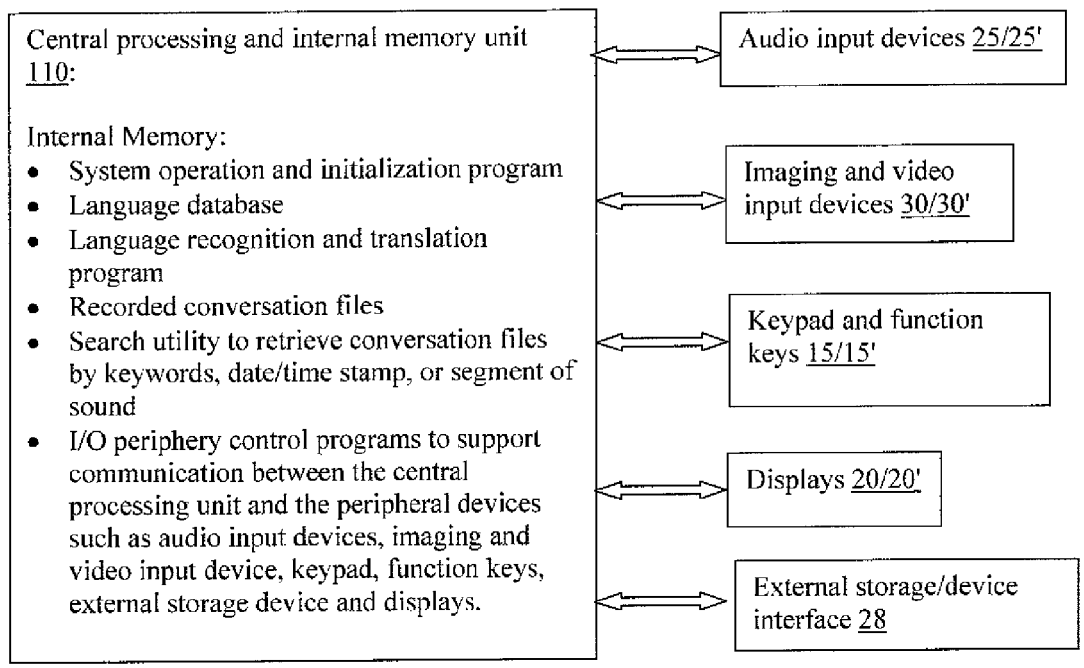
FIG. 3 is a block diagram of system configuration of an international language translation and learning system in accordance with features of the present invention.
Figure 4:
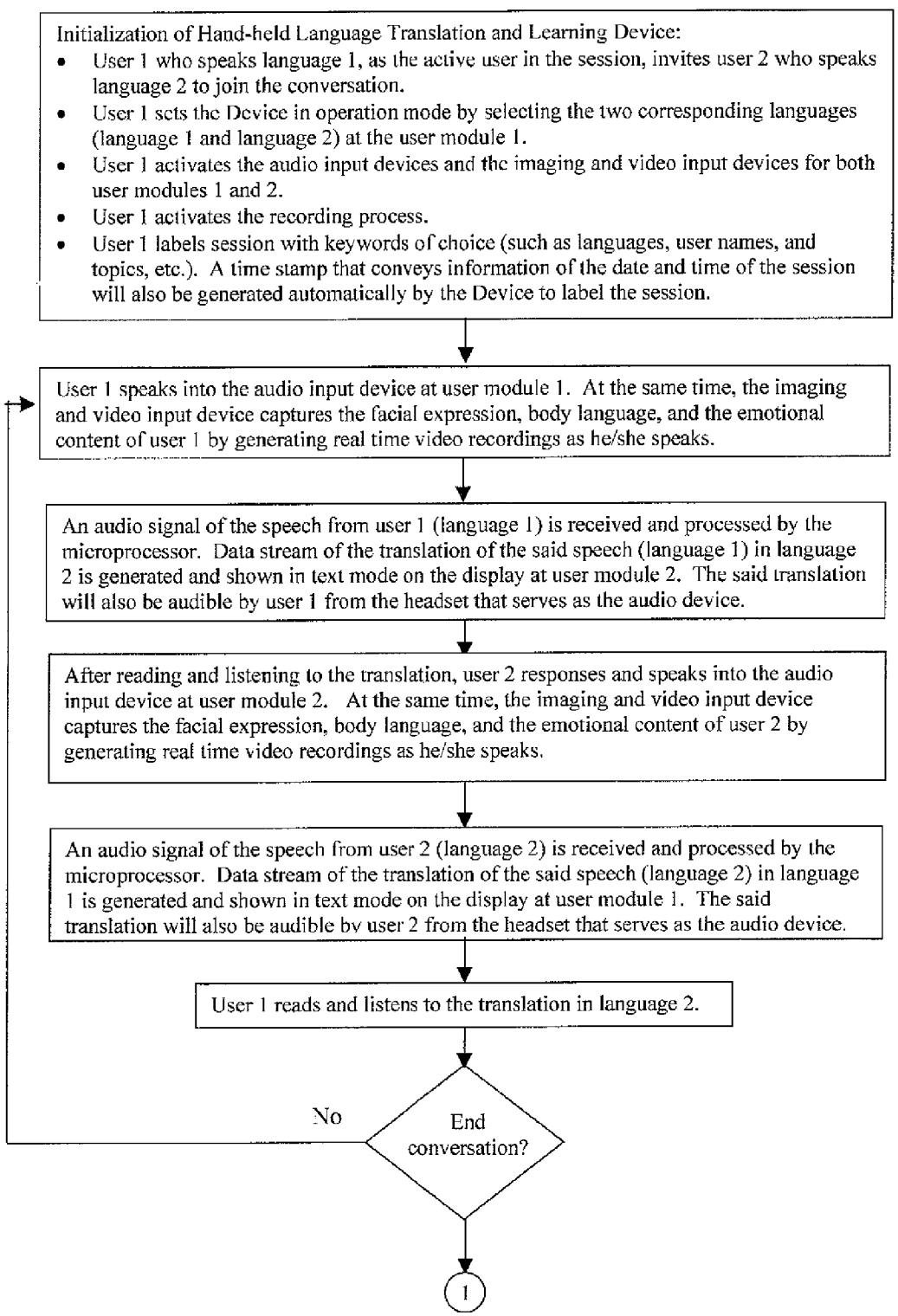
FIGS. 4A and 4B show a flow chart steps processed by the present device.
Figure 4:
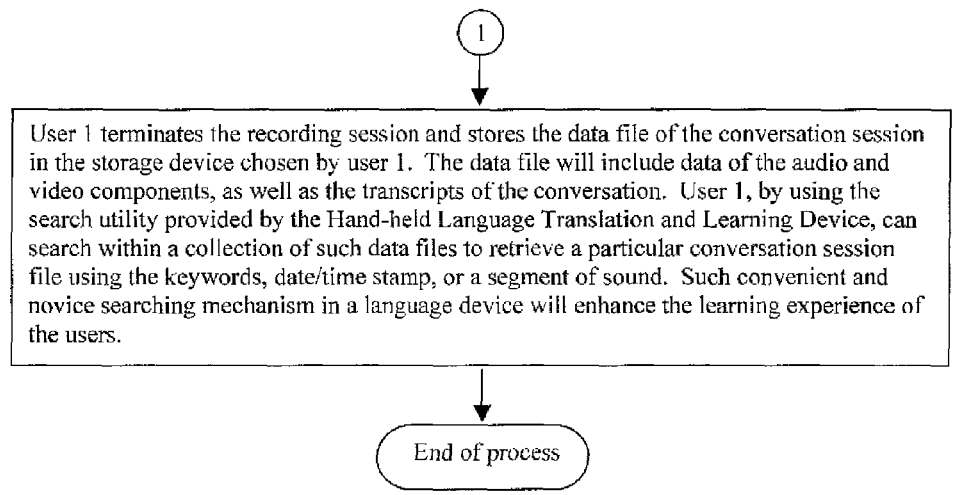

Referring to FIG. 3, illustrated is a block diagram 100 of the system configuration of an international language translation and learning system 10 described in FIGS. 1 and 2. In accordance with features of the present invention, two user modules are provided in order to simultaneously support a translation session between two parties. In order to support a language translation system for two users, two user-machine interfaces 15/15', two displays 20/20', two audio input devices 25/25', and/or two imaging and video input devices 30/30' must be provided. In addition to this basic hardware, the international language translation and learning system 10 requires at least one microprocessor adapted to process synchronized translations between two users. Evolution in modern microprocessor technology has allowed high-speed calculation, and with the advance of dual- or quad-core architect, these microprocessors are capable of supporting synchronized translation session between two users. The central processing unit 110 will also require access to a language database 115. Examples of one-way language databases used for handheld devices are described and listed for sale via the LANGUAGE TEACHER, INC, 3930 Swenson St. #310, Las Vegas, Nev. 89119, and ECTACO CORPORATE CENTER 31-21 31 Street, Long Island City, N.Y., 11106.

In accordance with using the present invention, it can now be appreciated that recorded translation sessions can be played back by users after a session is copied onto recordable media using the external recordable media port 28. In accordance with an additional feature of using the invention, a search utility will be implemented in the central processing unit 110 so that the user can easily retrieve a particular recorded session according to the date/time of recording, the keywords chosen by the user, or a segment of sound. The provision of software supporting these features can be provided by the skilled after appreciating the utility of the present invention. Furthermore, it is a feature of the present invention that session playback can be set to replay a session in a second (foreign) language, so that the user can learn the second language. For example, when first user primarily speaks in English and a second user speaks in French during the recorded translation session, the first user can replay the conversation in French in order to practice the language and learn by hearing the audio record of the conversation, as well as by observing the recorded video and images of the conversation. And in accordance with yet another feature of using the present invention, it can be appreciated now that, during the playback of a recorded audio conversation, the transcript of the conversation in language 1 and language 2 can be displayed as text on the display screen associated with a personal computer or the translation system 10/10'. Speech to text software can process the conversion as previously described. It would also be beneficial for learning that the conversation is narrated in the native language of the user and is simultaneously displayed in text in the foreign language that the user is trying to acquire. These and other unique features can now be appreciated given the foregoing disclosure, and also given the following claims.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A hand-held language translation device comprising:
 a microprocessor configured to receive and record during a recording session
  (i) an audio input signal in either analog or digital format from a foreign speaker, and;
  (ii) a simultaneous visual input signal in either analog or digital format generated by a camera which captures the facial expression and body language of the foreign language speaker while the foreign language speaker speaks,
 Wherein the user of the hand-held translation device labels the recording session with chosen keywords; wherein a time stamp that conveys information of the date and time of the session will also be generated automatically by the device to label the session
 wherein upon receiving the analog or digital audio input signal from the foreign speaker the microprocessor is capable of translating the spoken foreign language into a written form in the language of the user of the hand-held translation device, whereby the written translation segment is stored in a searchable and retrievable manner, such that the user of the hand-held translation device may search and retrieve the file that includes the translated written segment by a keyword chosen by the user, and/or by the date/time stamp of the recording,
 wherein upon retrieving the appropriate file indexed by the keyword and/or date/time stamp, the user can replay the corresponding analog or digital audio input signal and corresponding analog or digital visual input signal of the foreign speaker to facilitate the learning of the foreign language.

\* \* \* \* \*